United States Patent
Zhou et al.

(10) Patent No.: US 9,841,567 B1
(45) Date of Patent: Dec. 12, 2017

(54) TWO-DIMENSIONAL OPTICAL SCANNING METHOD AND OPTICAL SCANNING ADAPTER FOR INSPECTING MULTIPLE-FIBER OPTIC CONNECTOR

(71) Applicant: LIGHTEL TECHNOLOGIES, INC., Renton, WA (US)

(72) Inventors: Ge Zhou, Renton, WA (US); Shangyuan Huang, Seattle, WA (US)

(73) Assignee: LIGHTEL TECHNOLOGIES, INC., Renton, WA (US)

( * ) Notice: Subject to any disclaimer, the term of this patent is extended or adjusted under 35 U.S.C. 154(b) by 17 days.

(21) Appl. No.: 15/238,599

(22) Filed: Aug. 16, 2016

(51) Int. Cl.
*G02B 6/38* (2006.01)
*G02B 26/10* (2006.01)

(52) U.S. Cl.
CPC .......... *G02B 6/385* (2013.01); *G02B 26/101* (2013.01); *G02B 26/105* (2013.01)

(58) Field of Classification Search
CPC .............................. G02B 6/385; G01M 11/008
USPC ........................................................ 356/73.1
See application file for complete search history.

(56) References Cited

U.S. PATENT DOCUMENTS

| | | | |
|---|---|---|---|
| 6,751,017 B2 | 6/2004 | Cassady | |
| 6,879,439 B2 | 4/2005 | Cassady | |
| 7,336,884 B2 | 2/2008 | Zhou et al. | |
| 8,104,976 B2 | 1/2012 | Zhou et al. | |
| 9,110,252 B2 | 8/2015 | Zhou et al. | |
| 2015/0092043 A1* | 4/2015 | Baribault | H04N 5/2252 348/125 |

* cited by examiner

*Primary Examiner* — Kimberly N Kakalec
(74) *Attorney, Agent, or Firm* — Pai Patent & Trademark Law Firm; Chao-Chang David Pai

(57) ABSTRACT

An optical scanning adapter for shifting the imaging axis of an inspection probe for inspecting fiber endfaces of a multiple-fiber connector includes a housing, a fitting tip having a mating interface for interfacing with the connector, an imaging assembly, an x-direction driving mechanism, a y-direction driving mechanism, and a connecting portion for connecting an inspection probe. The imaging assembly includes a first lens, a first reflective surface, a second reflective surface, and a second lens. The connector endfaces are placed on the front focal plane of the first lens. The x-direction driving mechanism shifts the imaging axis of the imaging assembly along a first direction by translating the first lens and the first reflective surface together, whereas the y-direction driving mechanism shifts the imaging axis along a second direction orthogonal to the first direction by turning the second reflective surface about the optical axis of the second lens.

13 Claims, 11 Drawing Sheets

TWO-DIMENSIONAL OPTICAL SCANNING METHOD AND OPTICAL SCANNING ADAPTER FOR INSPECTING MULTIPLE-FIBER OPTIC CONNECTOR

BACKGROUND OF THE INVENTION

1. Field of the Invention

The invention relates to fiber-optic connector inspection and more particularly to an optical scanning adapter for a connector inspection probe or microscope, whereby the imaging axis of the inspection probe or microscope may be shifted in two mutually orthogonal directions over the ferrule surface of a multiple-fiber optic connector having multiple rows of endfaces, so that any of the individual endfaces may be focused and inspected without relative movement of the inspection probe/microscope with respect to the connector and without a need of refocusing the inspection probe or microscope for each of the endfaces under inspection.

2. Description of the Related Art

The widespread implementation of fiber-optic communication for high-density interconnections has driven more and more multiple-fiber connectors to be adopted in the industry. This creates an urgent need for regularly inspecting and maintaining the multiple-fiber connectors in place, which are often situated behind backplanes or in locations which are very difficult to access.

It is well known in the fiber-optic communication industry that the endfaces of optical fibers within communication systems must be kept clean and undamaged, otherwise serious signal loss could result. The demand for cleanliness for fiber-optic endfaces has become even more stringent as the communication bandwidths increase and new communication technologies requiring higher laser power are applied.

Many types of inspection probes and microscopes are already available for inspecting endfaces of a fiber-optic connector to make sure that the endfaces are undamaged and clean. Due to the need for sufficient magnification, the endfaces are typically inspected only one or two at a time. For a multiple-fiber connector having optical fibers arranged in a single row, with the centers of the endfaces spaced typically at 0.25 mm, the inspection probe or microscope must be able to scan from one side to the other side of the connector in order to inspect each of the fiber-optic endfaces. Lately, multiple-fiber connectors with optical fibers arranged in multiple rows (up to 6 rows and 12 optical fibers per row) have been developed and gradually adopted in the fiber-optics industry. As an example, FIG. 1A shows such a multiple-fiber connector 30, known in the industry as an MTP/MPO connector, which has four rows of endfaces 321 arranged in and coplanar with the ferrule surface 320. FIG. 1B shows the front view of the ferrule surface 320 and endfaces 321 of the connector 30 shown in FIG. 1A. For the purpose of endface inspection, the ferrule surface 320 of the multiple-fiber connector 30 may be divided into subareas 3201, 3201, etc., which may be inspected one by one by the inspection probe or microscope.

For such multiple-row fiber-optic connectors, the inspection probe or microscope must be able to shift its imaging axis, not only from side to side within each row but also from row to row, in order for all the endfaces to be focused and inspected.

U.S. Pat. Nos. 6,751,017 and 6,879,439 (both to Cassady) disclose a microscope for inspecting fiber-optic endfaces in a (single row) multiple-fiber connector. The microscope comprises a slider assembly, a slider chassis and a drive assembly, in which the driver assembly interfaced with the slider assembly is capable of selectively displacing the slider chassis along an axis of motion to selectively direct the imaging axis of the microscope between adjacent fiber-optic endfaces.

U.S. Pat. No. 7,336,884 (to Zhou et al.) provides an adaptive device for inspecting fiber-optic endfaces arranged in a single row through the microscope. The device comprises a supporting body; a pendular arm rotatably mounted to the supporting body; a fitting tip attached to the pendular arm; and a bevel wheel fastened to the supporting body. The bevel wheel is adapted to swing the pendular arm relative to the supporting body so that the imaging axis of the microscope is shifted relative to the fitting tip to selectively align with the endfaces for inspection. However, with this device, the imaging axis of the microscope moves along a circular track relative to the fitting tip and may not be aligned with the center of some of the endfaces in a (single-row) multiple-fiber connector.

U.S. Pat. No. 8,104,976 (to Zhou et al.) discloses an improved adaptive device for shifting the imaging axis of the microscope in a straight line over the endfaces of a single-row multiple-fiber connector for inspecting the endfaces. The adaptive device is capable of bringing each endface of the multiple-fiber connector into the field of view of the microscope for inspection. More specifically, the adaptive device comprises an adjustment driver and a swinging lever connected to a fitting tip, wherein the adjustment driver is adapted to swing the optical tube of the microscope relative to the swinging lever, thereby selectively shifting the imaging axis of the microscope relative to the fitting tip along a straight-line over the endfaces of a single-row multiple-fiber connector interfaced with the fitting tip.

U.S. Pat. No. 9,110,252 (to Zhou et al.) discloses an adaptive device for shifting the imaging axis of a microscope in two mutually orthogonal directions relative to the endfaces of a fiber-optic connector with multiple rows of optical fibers to selectively align the imaging axis with the endfaces so that each of the endfaces can be brought into the field of view of the microscope for inspection. The adaptive device is constructed to have a first swinging lever rotatable about a first swinging axis perpendicular to the imaging axis of the microscope connected to the adaptive device; a second swinging lever rotatable about a second swinging axis perpendicular to the first swinging axis; and a fitting tip connected to the second swinging lever for interfacing with the fiber-optic connector. Using two sets of biasing means and adjustment drivers, the imaging axis passing through the fitting tip can be shifted in two mutually perpendicular directions to selectively align with any endface of the fiber-optic connector. However, with this adaptive device, due to the required relative movement of the microscope and the fiber endfaces, when the imaging axis is shifted over the endfaces of a connector fixed in location, the microscope will also be physically shifted (in two directions), thus causing operational difficulties.

In the U.S. Patent Pub. No. 2015/0092043, Baribault also discloses a multiple-fiber connector inspection tip for selectively inspecting one or more of the fiber-optic endfaces arranged in two orthogonal directions. The imaging assembly of the inspection tip includes two mirrors and an alignment module, wherein the alignment module shifts the imaging axis (a) in a transverse direction by translating one of the mirrors with respect to the other, and (b) in a direction orthogonal to the transverse direction by collectively rotating both of the mirrors. However, with each translation of the mirrors relative to each other to shift the imaging axis across the endfaces, the focus will typically be required to be readjusted on the endface under inspection. It is extremely time-consuming and inconvenient to have to readjust focus for each endface of the multiple-fiber connector.

Therefore, an improved adaptive device for an inspection probe/microscope is needed for inspecting endfaces of a multiple-row multiple-column fiber-optic connector, wherein the imaging axis of the inspection probe/microscope may be shifted relative to the ferrule surface of the connector in two mutually perpendicular directions without physically shifting the inspection probe relative to the connector and without a need to refocus the inspection probe/microscope for each of the endfaces under inspection.

BRIEF SUMMARY OF THE INVENTION

The optical scanning adapter of the present invention is designed to enable the imaging axis of an inspection probe/microscope to be shifted in two orthogonal directions over the ferrule surface of the multiple-fiber connector under inspection, without physically shifting the inspection probe/microscope relative to the ferrule surface, and without a need to readjust the focus of the inspection probe/microscope.

The optical scanning adapter includes a housing, a fitting tip or connector holder having a mating interface for interfacing with the ferrule surface of a multiple-fiber connector, an imaging assembly, an x-direction driving mechanism, a y-direction driving mechanism, and a connecting portion for connecting to an inspection probe/microscope.

The imaging assembly includes a first lens, a planar first reflective surface, a planar second reflective surface, and a second lens. The first lens is placed in the housing behind the mating interface such that the optical axis of the first lens is perpendicular to the mating interface, and such that the mating interface (and therefore the ferrule surface interfaced there) coincides with the front focal plane of the first lens. The first reflective surface is placed behind the first lens at 45° relative to the optical axis of the first lens. A transverse direction is defined as the direction in which an incident line along the optical axis of the first lens is reflected by the first reflective surface. It follows that the transverse direction is perpendicular to the optical axis of the first lens. It is preferable, although not required, that the first reflective surface is parallel to an y-axis (which is perpendicular to rows of the endfaces), and therefore that the transverse direction is parallel to an x-axis (which is parallel to rows of the endfaces). The second lens is placed in front of the connecting portion such that its optical axis is essentially collinear with a central axis of the connecting portion. The second reflective surface faces the first reflective surface and is tilted at an angle from the optical axis of the second lens so that an incident ray along the optical axis of the first lens and along the transverse direction will be finally reflected in the direction along the optical axis of the second lens. Thus, the optical axis of the second lens and the optical axis of the first lens can be either skew lines, parallel lines or intersected lines. When the optical axis of the second lens is parallel to the optical axis of the first lens, the second reflective surface is tilted at 45° from the optical axis of the second lens. The y-direction driving mechanism can cause the second reflective surface to turn about the optical axis of the second lens in order to shift the imaging axis of the imaging assembly in a y-direction (i.e. parallel to the y-axis). The second reflective surface is further aligned with the first reflective surface such that the transverse direction also intersects with the optical axis of the second lens on the second reflective surface.

The connecting portion is disposed at a rear side of the housing for interfacing with an inspection probe/microscope, such that a rear focal plane of the second lens coincides with an object plane of the inspection probe/microscope. Therefore, a ray emitted from a point on the ferrule surface and passing through the first lens is reflected by the first reflective surface towards the second reflective surface, then is reflected by the second reflective surface towards and through the second lens, forming a corresponding image point at the rear focal plane of the second lens.

The x-direction driving mechanism shifts the imaging axis of the imaging assembly in a direction parallel to the x-axis by translationally moving the first lens and the first reflective surface together along the transverse direction, whereas the y-direction driving mechanism shifts the imaging axis in a direction parallel to the y-axis by turning the second reflective surface about the optical axis of the second lens.

With the optical scanning adapter of the present invention, while the imaging axis is shifted in two orthogonal directions over the ferrule surface, the point where the imaging axis intersects with the ferrule surface will form an image point on the rear focal plane of the second lens, and the inspection probe/microscope need not readjust its focus for every point that the imaging axis is shifted to. Therefore, the optical scanning adapter makes it much easier and more efficient for a conventional inspection probe/microscope to inspect a multiple-fiber connector.

BRIEF DESCRIPTION OF THE DRAWINGS

The following detailed description of the preferred embodiments of the present invention can best be understood when read in conjunction with the following drawings, in which.

DETAILED DESCRIPTION OF THE INVENTION

Hereafter, examples will be provided to illustrate the preferred embodiments of the optical scanning method and optical scanning adapter according to the present invention for enabling a connector inspection probe (or microscope) to shift its imaging axis in two orthogonal directions in order to inspect multiple-fiber connectors. Advantages and effects of the invention will become more apparent from the following description of the present invention in conjunction of the accompanying drawings.

For clarity of the following description, the following terms/definitions in geometry are worth noticing: two lines are "parallel" if they are coplanar and do not intersect; two lines are "skew lines" if they do not intersect and are not coplanar; the angle between two skew lines is the angle between two lines that are parallel to the two skew lines respectively and intersect; the angle between a line and a plane intersected by the line is the angle between the line and its projection on the plane; the angle between two intersecting planes is the angle between their respective normal vectors; a line is parallel to a plane if they do not intersect, or if a normal vector of the plane is orthogonal to the line. When applied to two lines in space, the terms "perpendicular" and "orthogonal" are mostly considered synonymous, although the term "perpendicular" implies that the two lines intersect. Finally, two angles are "congruent" if they are of the same size or measure (in degrees of radians).

Figure 2:
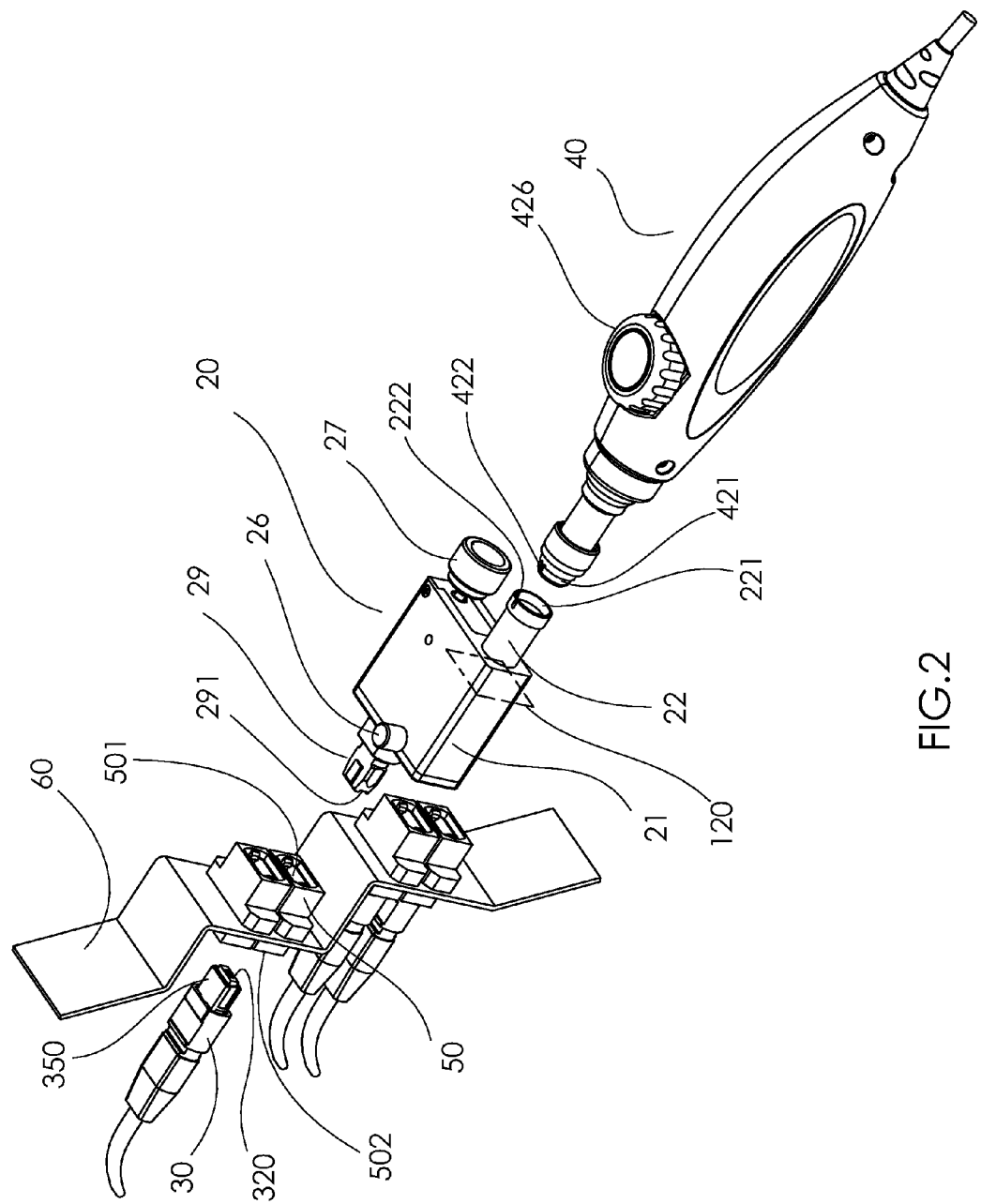
FIG. 2 shows a two-dimensional optical scanning adapter according to the present invention positioned in relation to a multiple-fiber connector and a conventional connector inspection probe/microscope before they are coupled together to enable the inspection probe/microscope to scan the ferrule surface and inspect the fiber endfaces of the multi-fiber connector.

FIG. 2 shows an embodiment of the two-dimensional optical scanning adapter 20 according to the present invention positioned in relation to a multiple-fiber connector 30 (such as an MTP/MPO connector), a conventional connector adapter 50, and a conventional connector inspection probe 40 before they are coupled together for inspecting the multiple-fiber connector 30. Note that although a connector inspection probe 40 is described below and shown in the drawings, the optical scanning adapter 20 according to the present invention can also be used with a microscope or other image sensor.

The optical scanning adapter 20 has a fitting tip 29 at a front side thereof and a connecting portion 22 at a rear side thereof. When in use, the optical scanning device 20 is connected via the connecting portion 22 to the front end 421 of the inspection probe 40, and connected via the fitting tip 29 to the front opening 501 of the connector adapter 50, which is usually fixed in a communication system panel 60. Thus, a mating interface 291 of the fitting tip 29 of the optical scanning adapter 20 interfaces with the ferrule surface 320 on the front portion 350 of the multiple-fiber connector 30, which is connected to the rear opening 502 of the connector adapter 50. In practice, as long as the ferrule surface 320 can be interfaced with the fitting tip 29, the connector adapter 50 can be in other forms or structure or even made an integral part of the fitting tip 29, such as the connector holder 28 illustrated in FIG. 4. As is shown in FIG. 2, the connecting portion 22 has a rear opening 221 adapted for receiving the front end 421 of the inspection probe 40. In an embodiment, a groove 222 is formed on the inner surface of the rear opening 221 of the connecting portion 22 for receiving a matching key 422 on the outer surface of the front end 421 of the inspection probe 40 to ensure proper and secure hook-up between the connecting portion 22 of the optical scanning adapter 20 and the inspection probe 40. The rear connecting portion 22 may be formed with the housing as a single piece, or separately formed and mechanically connected to the housing 21 of the optical scanning adapter 20.

At the rear side of the optical scanning adapter 20, the connecting portion 22 is connected to the front end 421 of the inspection probe 40 in a way such that the image plane 120 of the imaging assembly (to be described later) of the optical scanning adapter 20 coincides with the object plane of the optical system of the inspection probe 40, within a focusing range. The focal length of the optical system of the inspection probe 40 can be adjusted with a focus adjusting knob 426.

At the front side of the optical scanning adapter 20, the fitting tip 29 is connected to the connector adapter 50 in a way such that the ferrule surface 320 of the multiple-fiber connector 30 is positioned at a mating interface 291 at the front end of the fitting tip 29 and is coplanar with the object plane 110 (shown in FIG. 6) of the imaging assembly of the optical scanning adapter 20. In other words, the mating interface 291 of the fitting tip 29 defines an endface interfacing plane, which coincides with the object plane 110 of the imaging assembly of the optical scanning adapter 20 and on which the ferrule surface 320 of the connector 30 is placed when interfaced at the mating interface 291.

Figure 1A:
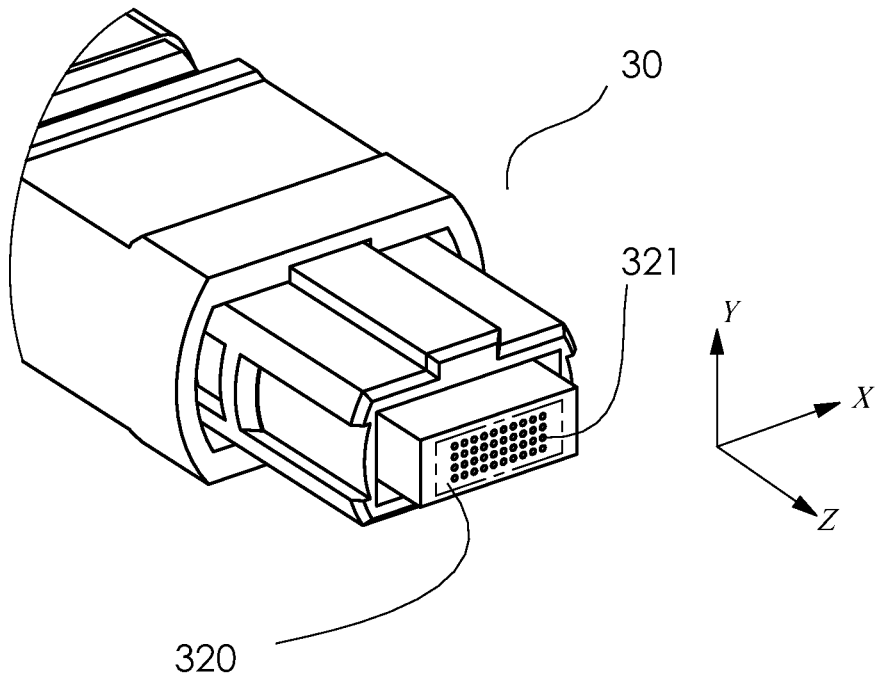
FIG. 1A is a perspective view of a multiple-fiber connector, known as an MTP/MPO connector in the industry, and the three-dimensional coordinate system used in describing the present invention.
Figure 1B:
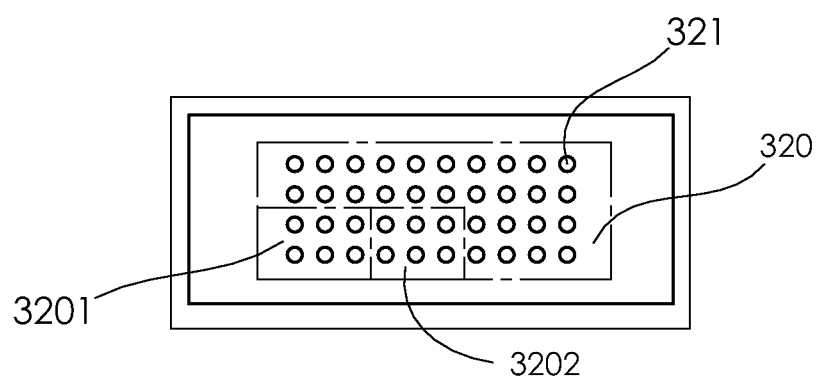
FIG. 1B shows the front view of the ferrule surface and the fiber endfaces of the multiple-fiber connector shown in FIG. 1A.
Figure 5A:
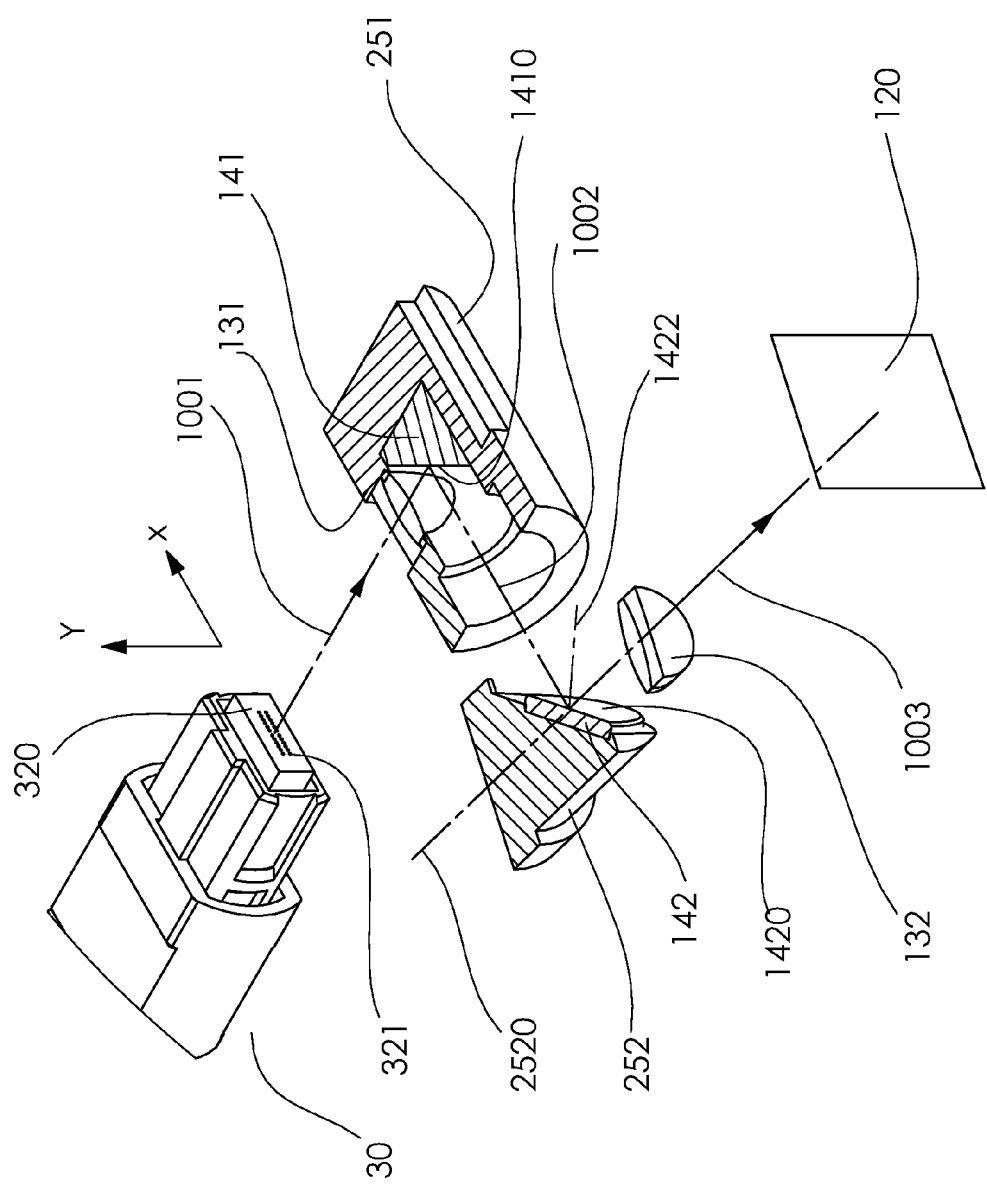
FIG. 5A is a partial cross-sectional view of a portion of the internal structure and components of the two-dimensional optical scanning adapter according to the present invention, illustrating an embodiment wherein the optical axes of the two lenses therein are not parallel.

For convenience of description, the ferrule surface 320 and the fiber endfaces 321 of the multiple-fiber connector 30 are placed in a 3-D Cartesian coordinate system, wherein the longer side of the ferrule surface 320 is parallel to the x-axis, and the shorter side of the ferrule surface 320 is parallel to the y-axis, as illustrated in FIG. 1A and FIGS. 5A/5B. Thus, when the endfaces 321 are arranged in multiple rows, the rows of endfaces 321 of the connector 30 are parallel to the x-axis. In reference to the coordinate system, the optical scanning adapter 20 further includes an x-direction driving mechanism and a y-direction driving mechanism for shifting the imaging axis in two orthogonal directions. In the embodiment shown in FIG. 2, an x-direction adjustment knob 27 disposed at the rear side of the optical scanning adapter 20 may be turned to cause the x-direction driving mechanism to shift the imaging axis of the imaging assembly of the optical scanning adapter 20 in the x-direction, i.e. parallel to the x-axis. Similarly, a y-direction adjustment knob 26 disposed at the top side of the housing 21 may be turned to shift the imaging axis of the imaging assembly of the optical scanning adapter 20 in the y-direction, i.e. parallel to the y-axis. Thus, the imaging axis of the imaging assembly may be shifted in two mutually orthogonal directions to allow the inspection probe 40 to scan over the ferrule surface 320 of the multiple-fiber connector 30, row-wise or column-wise, without physically shifting the inspection probe 40 relative to the connector 30. In other words, the function of the optical scanning adapter 20 is to direct the field of view of the optical system of the inspection probe 40 to each subarea (e.g. 3201, 3202 shown in FIG. 1B) of the ferrule surface 320 of the multiple-fiber connector 30, thus allowing the endfaces 321 of the connector 30 to be inspected, image thereof to be produced, analyzed and/or transmitted. In a more general embodiment of the optical scanning adapter 20, the two orthogonal scanning directions are not required to respectively parallel to the x-axis and y-axis (of the coordinate system for the ferrule surface 320). However, it is more convenient and more effective to have the two orthogonal scanning directions parallel to the two coordinate axes, respectively, as described above.

The structure and components of the optical scanning adapter 20 according to the present invention are illustrated in FIGS. 3-6. Generally, the optical scanning adapter 20 comprises a housing 21, an imaging assembly enclosed in the housing 21, a fitting tip 29 having a mating interface 291 disposed at the front side of the housing 21 for interfacing with a multiple-fiber connector 30, a connecting portion 22 disposed at the rear side of the housing 21, an x-direction driving mechanism, a y-direction driving mechanism, and a connecting portion 22 for interfacing with an inspection probe/microscope 40.

The imaging assembly of the optical scanning adapter 20 comprises a first lens 131, a planar first reflective surface 1410 disposed on a first reflector 141 and rearward to the first lens 131, a planar second reflective surface 1420 disposed on a second reflector 142 and facing the first reflective surface 1410, and a second lens 132 disposed rearward to the second reflective surface 1420. It is understood that although the term "lens" is used, it is not limited to a single lens, and can also be a set of multiple lens or other suitable optical mediums or systems. The imaging assembly is disposed in the housing 21 having an internal space such that a ray emitted from the ferrule surface 320 of a fiber connector 30 interfaced with the fitting tip 29 may travel from the ferrule surface 320, through the fitting tip 29 and the first lens 131 to the first reflective surface 1410, then is reflected from the first reflective surface 1410 to the second reflective surface 1420, and is reflected from the second reflective surface 1420, through the second lens 132, forming an image at the image plane 120.

Figure 5B:
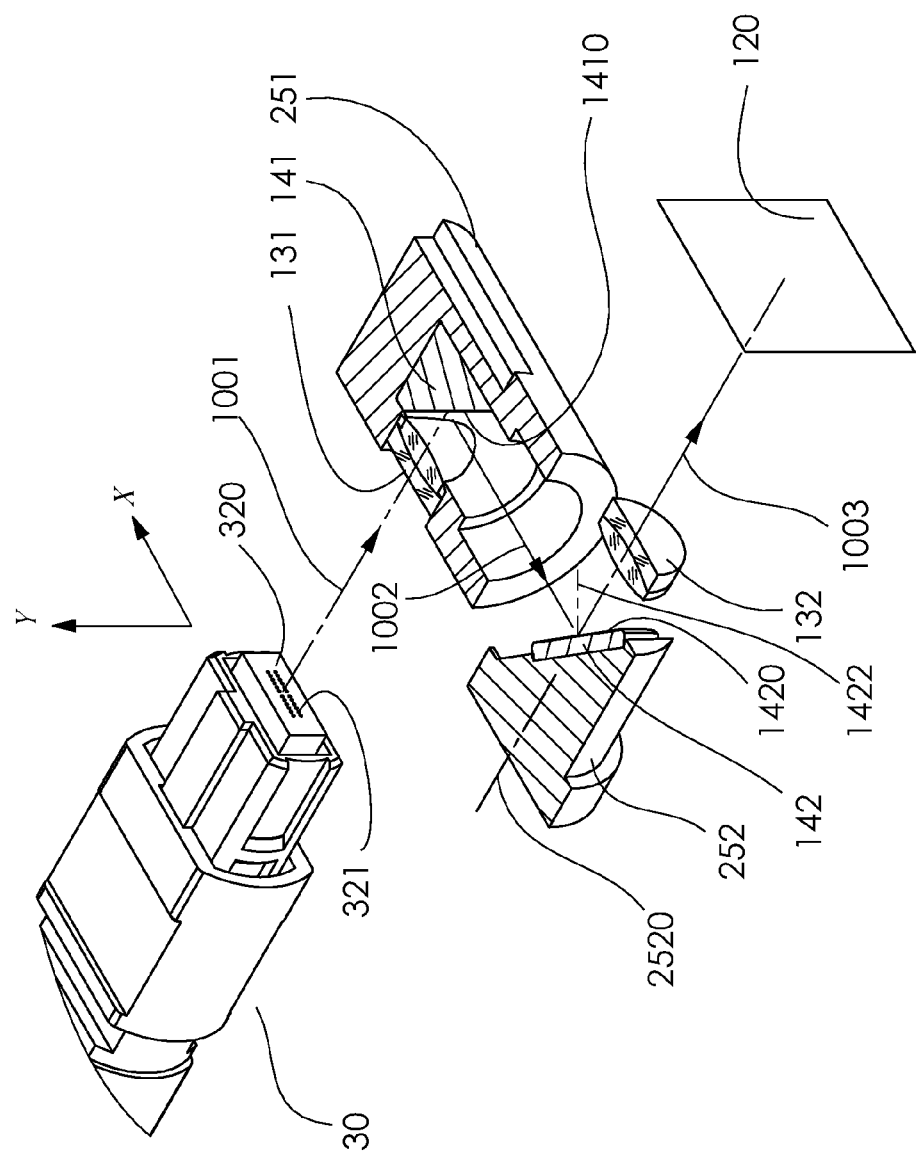
FIG. 5B, similar to FIG. 5A, illustrates an embodiment of the present invention wherein the optical axes of the two lenses therein are parallel.

FIGS. 5A and 5B show a partial cross-sectional view of the imaging assembly of the optical scanning adapter 20 according to the present invention. As illustrated in FIGS. 5A/5B and FIG. 6, the first lens 131 is placed so that its optical axis 1001 is perpendicular to the ferrule surface 320 of the connector 30 interfaced with the fitting tip 29 at the mating interface 291, and the first reflective surface 1410 is tilted at 45° relative to the optical axis 1001 of the first lens 131. (Namely, the angle between the optical axis 1001 of the first lens 131 and its projection on the first reflective surface 1410 is 45°.) Accordingly, the imaging axis of the imaging assembly is composed of three sections: the first section extending perpendicularly from the ferrule surface 320 to the first reflective surface 1410 along the optical axis 1001 of the first lens 131; the second section from the first reflective surface 1410 to the second reflective surface 1420 along a transverse direction 1002 (which is the direction in which an incident ray along the optical axis 1001 of the first lens 131 is reflected from the first reflective surface 1410, therefore is coplanar with the optical axis 1001 and the normal vector of the first reflective surface 1410 at the point where the optical axis 1001 intersects the first reflective surface 1410, and is perpendicular to the optical axis 1001); and the third section from the second reflective surface 1420 through the second lens 132 to the image plane 120 along the optical axis 1003 of the second lens 132. The normal vector 1422 of the second reflective surface 1420 with respect to the incident ray along the transverse direction 1002 is shown in FIGS. 5A and 5B. According to the law of reflection, the incident ray along the transverse direction 1002, the normal vector 1422 and the reflected ray along the optical axis 1003 of the second lens 132 are on the same plane called the plane of incidence. For scanning the endfaces 321 in a direction parallel to the transverse direction 1002, the first reflective surface 1410 and the first lens 131 are together translated in a direction parallel to the transverse direction 1002, as will be explained later using FIG. 7. Preferably, the transverse direction 1002 is made to parallel the x-axis, such that the endfaces 321 are scanned in a direction parallel to the x-axis. On the other hand, for scanning endfaces 321 in a direction orthogonal to the transverse direction 1002, or preferably parallel to the y-axis, the second reflective surface 1420 is turned about the optical axis 1003 of the second lens 132, as will be explained later using FIG. 8.

Therefore, a ray traveling along the optical axis 1001 of the first lens 131 will pass through the center of the first lens 131 without changing direction, and will then be reflected from the first reflective surface 1410 along the transverse direction 1002, which is perpendicular to the optical axis 1001 of the first lens 131.

As mentioned, the transverse direction 1002 is preferably made to parallel the x-axis of the aforementioned coordinate system for the ferrule surface 320. It follows that the first reflective surface 1410 is tilted not only at 45° relative to the optical axis 1001 of the first lens 131, but also tilted to parallel the y-axis. In other words, a normal vector of the first reflective surface 1410 is orthogonal to the y-axis. This arrangement makes it convenient and more effective to inspect the endfaces row-wise or column-wise by shifting the imaging axis in one direction for each row or column. However, this is not a requirement for the optic scanning device 20 to shift the imaging axis in two orthogonal directions.

Further, the second lens 132 is placed so that the second reflective surface 1420 is placed to face the first reflective surface 1410 and the incident ray along the transverse direction 1002 be reflected therefrom in the direction along the optical axis 1003 of the second lens 132. Such arrangement entails that the normal vector 1422 of the second reflective surface 1420 bisects the angle between the transverse direction 1002 and the optical axis 1003 of the second lens 132 (into two congruent angles). Depending upon the direction in which the optical axis 1003 of the second lens 132 is disposed, the optical axis 1001 of the first lens 131 and the optical axis 1003 of the second lens 132 may be skew lines, parallel lines, or intersected lines. When the two optical axes 1001, 1003 are skew lines, however, turning the second reflective surface 1420 about the optical axis 1003 of the second lens 132 will shift the imaging axis in both of the orthogonal directions (i.e. not only in the direction orthogonal to the transverse direction 1002, but also in the direction parallel to the transverse direction 1002), thus unnecessarily complicating the endface inspection operation. In contrast, when the two optical axes 1001 and 1003 are coplanar (i.e. they either intersect or parallel), turning the second reflective surface 1420 about the optical axis 1003 of the second lens 132 will shift the imaging axis only in the direction orthogonal to the transverse direction 1002. FIG. 5A illustrates the embodiment with the optical axis 1001 and the optical axis 1003 intersecting (when the two optical axes are extended), and FIG. 5B illustrates the embodiment with the two optical axes parallel to each other. Furthermore, as illustrated in FIG. 5B, when the optical axis 1001 and the optical axis 1003 are parallel, the second reflective surface 1420 will be tilted at 45° relative to the optical axis 1003 of the second lens 132. As will be shown later, because the second reflective surface 1420 may be turned about the optical axis 1003 of the second lens 132 by the y-direction driving mechanism to achieve optical scanning in the y-direction, the second reflective surface 1420 will not always parallel the first reflective surface 1410 even in the embodiment wherein the optical axis 1001 and the optical axis 1003 are parallel.

Figure 6:
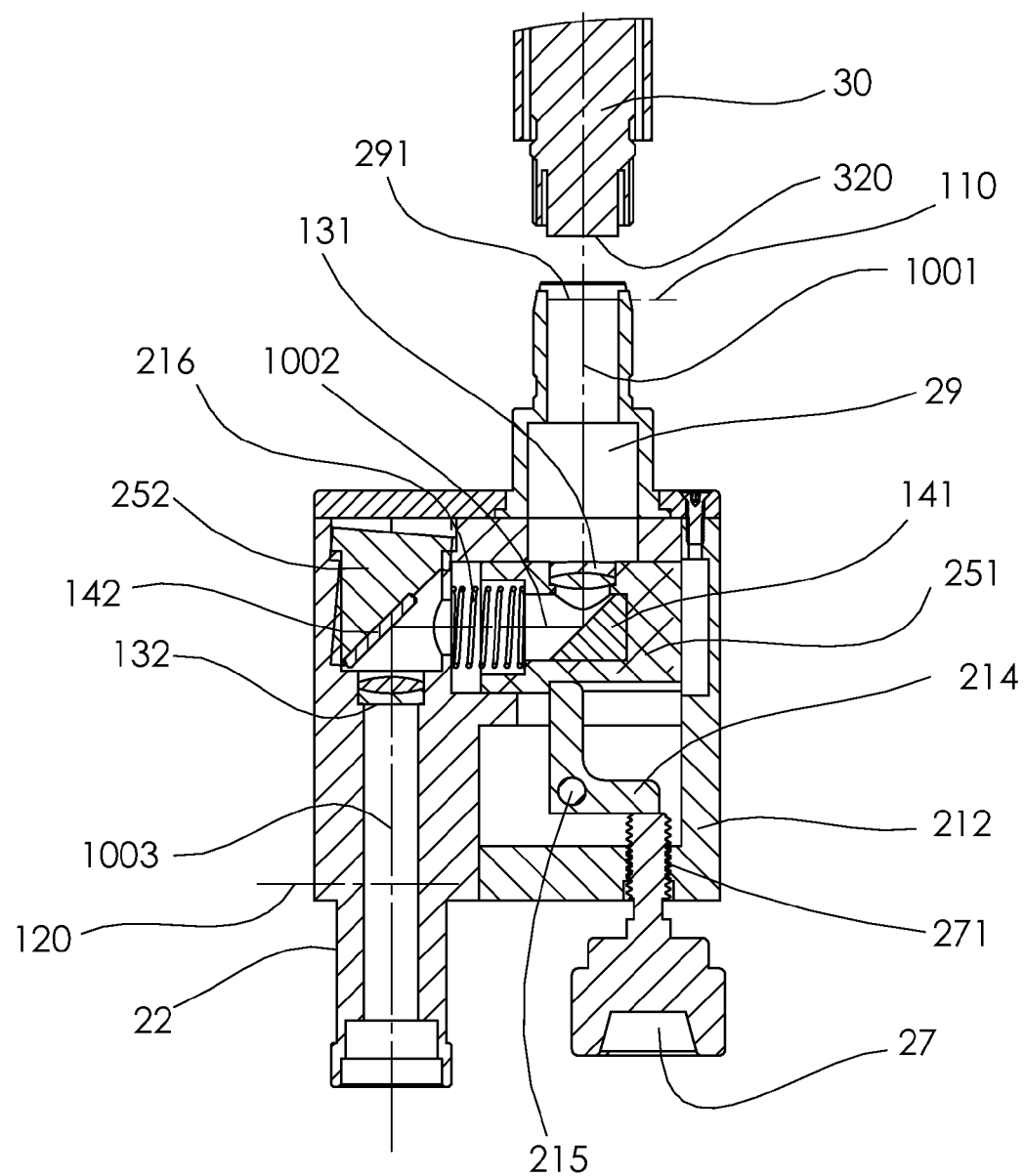
FIG. 6 is a cross-sectional view of the internal structure and components of the two-dimensional optical scanning adapter according to the present invention.
Figure 7:
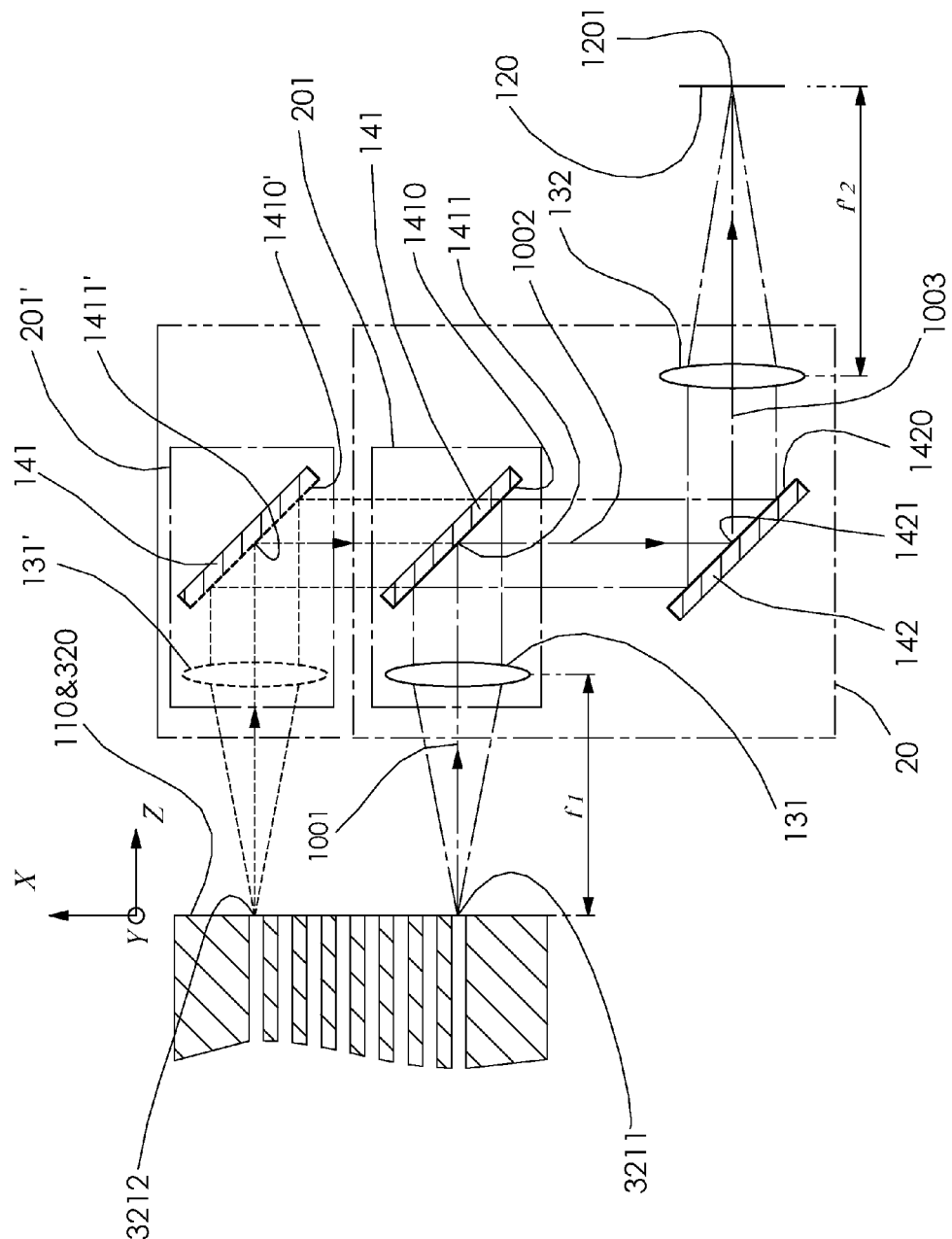
FIG. 7 illustrates how the optical scanning adapter according to the present invention shifts the imaging axis of the connector inspection probe/microscope in the transverse direction (parallel to rows of endfaces) over the ferrule surface of the multiple-fiber connector by translating a set of lens and reflective surface together.

As shown in FIGS. 6 and 7, it follows from the relative positions and orientation of the second reflective surface 1420 and the optical axis 1003 of the second lens 132 that a ray along the transverse direction 1002 will intersect the optical axis 1003 of the second lens 132 on the second reflective surface 1420. In other words, the transverse direction 1002 (which is collinear with the reflected ray of an incident ray along the optical axis 1001 of the first lens 131 from the first reflective surface 1410) intersects the optical axis 1001 of the first lens 131 and the optical axis 1003 of the second lens 132 on the reflective surfaces 1410 and 1420, respectively.

As mentioned above, when a multi-fiber connector 30 is interfaced with the fitting tip 29 at the mating interface 291 (through a connector adapter 50 or equivalent), the ferrule surface 320 and the fiber endfaces 321 thereon (and therefore the mating interface 291) are coplanar with the object plane 110 of the imaging assembly of the optical scanning adapter 20. In more specific terms, the ferrule surface 320 and the fiber endfaces 321 of the connector 30 are placed on the front focal plane of the first lens 131. With this arrangement, the ferrule surface 320 and the fiber endfaces 321 of the connector 30 will form an image on the image plane 120 of the imaging assembly, which is simply the rear focal plane of the second lens 132.

Figure 3:
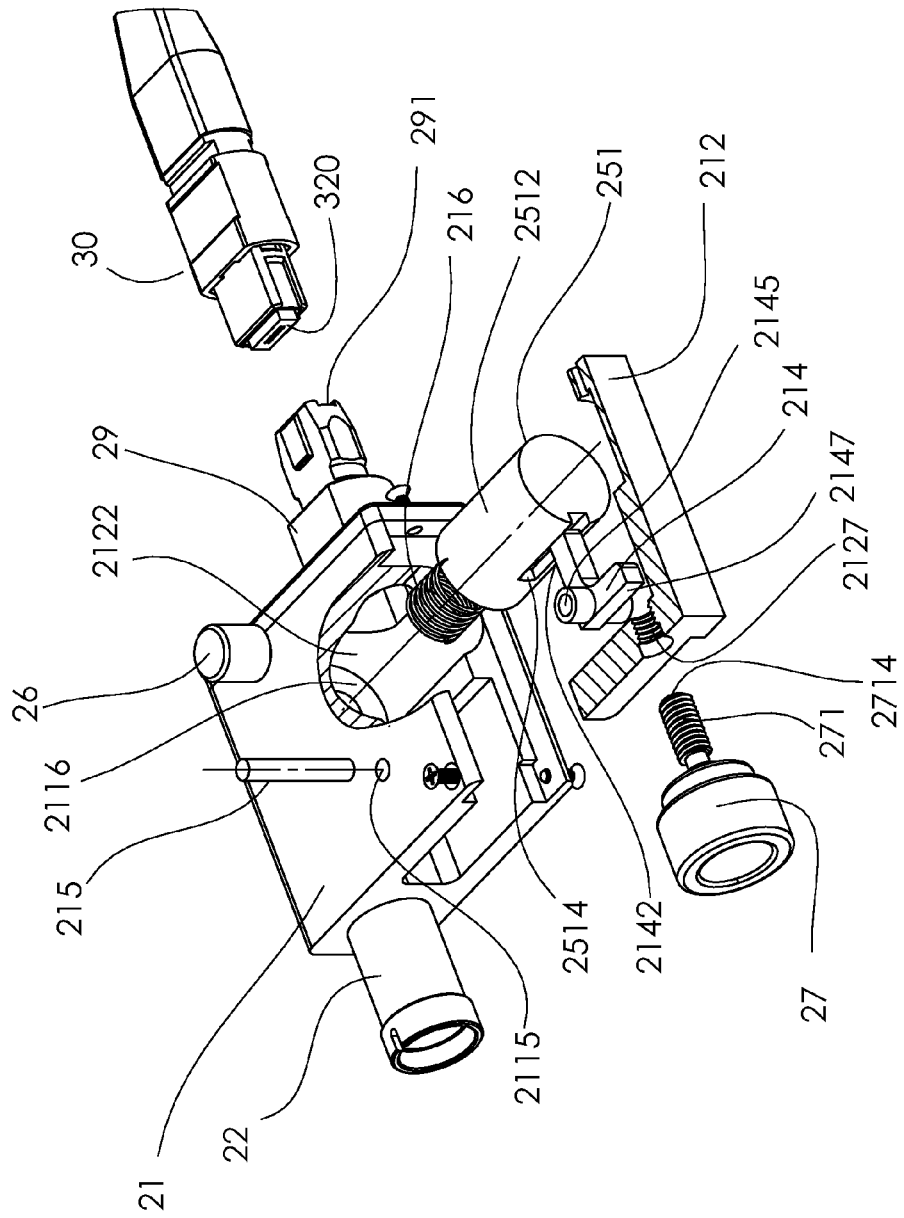
FIG. 3 is an exploded view of the two-dimensional optical scanning adapter according to the present invention, showing the structure and components of the x-direction driving mechanism for shifting the imaging axis of the inspection probe/microscope in a transverse direction parallel to rows of endfaces.

The x-direction driving mechanism is illustrated in FIG. 3. For the x-direction driving mechanism of the optical scanning adapter 20 to achieve x-direction scanning as stated above, the first lens 131 and the first reflective surface 1410 are arranged such that the first lens 131 and the first reflective surface 1410 are together translationally movable along the transverse direction 1002. In this embodiment, the first lens 131 and the first reflective surface 1410 are included and disposed in a lens-reflector combo 251. It will be shown later that as the lens-reflector combo 251 is translationally moved along the transverse direction 1002, the object point on the ferrule surface 320 corresponding to the image point 1201 (referring to FIG. 7) at the rear focal point of the second lens 132 will follow a track on the ferrule surface 320 parallel to the transverse direction 1002 (and to the x-axis when the transverse direction is made to parallel the x-axis).

As shown in FIGS. 3 and 5A/5B, to allow the lens-reflector combo 251 to be translationally movable parallel to the transverse direction 1002, the lens-reflector combo 251 has an outer surface 2512 matching the inner surface of a sliding guide hole 2122 disposed inside the housing 21 of the optical scanning adapter 20. Both the outer surface 2512 of the lens-reflector combo 251 and the inner surface of the sliding guide hole 2122 extend in a direction parallel to the transverse direction 1002. It is understood that although the outer surface 2512 of the lens-reflector combo 251 and the inner surface of the sliding guide hole 2122 are shown to be circular in the drawings, they are not limited to the circular contour and can take any matching contour as long as a smooth precise translational movement of the lens-reflector combo 251 can be achieved along the transverse direction 1002.

As shown in FIGS. 3, 5A/5B and 6, the x-direction driving mechanism comprises an x-direction adjustment knob 27 having a lead screw 271, an L-shaped or angled lever 214 pivoted on a shaft 215 to the housing 21, and a helical spring 216. The distal end 2714 of the lead screw 271 extends through a matching threaded hole 2127 on the rear side of the housing 21 into the housing 21 to interact with the angled lever 214, causing the angled lever 214 to turn about the shaft 215. The distal end 2714 of the lead screw 271 pushes against one end 2147 of the angled lever 214, whereas the other end 2142 of the angled lever 214 is in contact with a pushing step 2514 on the outer surface 2512 of the lens-reflector combo 251. The helical spring 216 is engaged between the lens-reflector combo 251 and an annular stopping surface 2116 disposed at a distance from the second reflective surface 1420. The helical spring 216 exerts an elastic pushing force against the translational movement of the lens-reflector combo 251 in the sliding guide hole 2122. In this embodiment, one end of the shaft 215 is received in a through hole 2115 formed on the top side of the housing 21; the other end of the shaft 215 passes through another through hole 2145 disposed at the middle of the angled lever 214. In this embodiment, the through hole 2145 is formed in a short tube joined with the angled lever 214. Thus, when the x-direction adjustment knob 27 is turned to extend/retract the distal end 2714 of the lead screw 271 in the housing 21, the angled lever 214 will turn about the shaft 215, constantly pushing the lens-reflector combo 251 at the pushing step 2514 against the elastic force of the helical spring 216, causing the stable translation of the lens-reflector combo 251 in the sliding guide hole 2122 along the transverse direction 1002.

By translationally moving the lens-reflector combo 251, the x-direction driving mechanism causes the optical axis 1001 of the first lens 131 to be shifted, thus causing different points on the ferrule surface 320 to be aligned with the optical axis 1001 of the first lens 131 and imaged on the image plane 120. This will be explained later.

Figure 4:
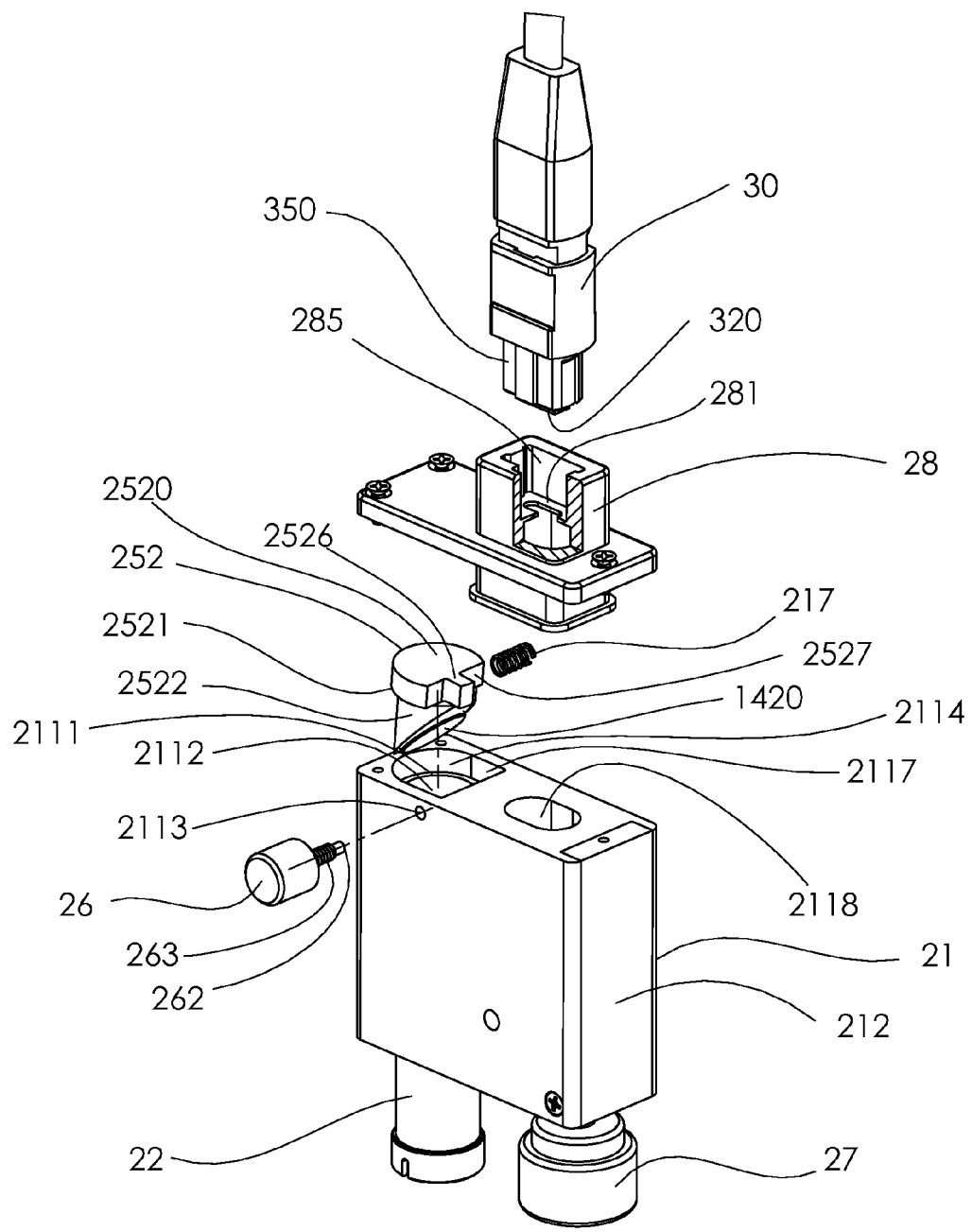
FIG. 4 is another exploded view of the two-dimensional optical scanning adapter according to the present invention, showing the structure and components of the y-direction driving mechanism for shifting the imaging axis of the inspection probe/microscope in a direction orthogonal to the transverse direction.

The y-direction driving mechanism is illustrated in FIGS. 4 and 5A/5B. As shown in FIG. 4, which illustrates the particular embodiment wherein the optical axis 1001 and the optical axis 1003 are parallel, as illustrated in FIG. 5B, the y-direction driving mechanism comprises a y-direction adjustment knob 26 having a lead screw 263 extending through a matching threaded hole 2113 on the top side of the housing 21 into the housing 21, a lens-turning portion 252, and a spring 217. The lens-turning portion 252 comprises a cylindrical column 2522 with one end slanted (at 45° relative to the central axis 2520 of the cylindrical column 2522 in this particular embodiment) to have the second reflective surface 1420 disposed thereon, an expanded rim 2521 connected to the other end of the cylindrical column 2522 and formed with two off-center, oppositely facing biasing surfaces 2526, 2527.

Note that in embodiments wherein the optical axis 1001 and the optical axis 1003 are not parallel, but intersect, as illustrated in FIG. 5A, the second reflective surface 1420 will be tilted at an angle other than 45° from the optical axis 1003. As described earlier, the angle tilted is one that causes the incident ray along the transverse direction 1002 to be reflected from the second reflective surface 1420 along the optical axis 1003. Therefore, the lens-turning portion 252 will have its slanted end disposed at that angle relative to the central axis 2520 of the cylindrical column 2522.

The cylindrical column 2522 is placed in a matching cylindrical turning guide hole 2112 formed in the housing 21 in communication with the connecting portion 22. The cylindrical column 2522 and the cylindrical turning guide hole 2112 both extend in a direction parallel to the optical axis 1003 of the second lens 132 and have a common central axis 2520 collinear with the optical axis 1003 of the second lens 132. The front end of the cylindrical turning guide hole 2112 is connected to an expanded cavity 2114 formed with a stopping step 2111 surrounding the front end of the cylindrical turning guide hole 2112. The expanded rim 2521 of the lens-turning portion 252 is received in the expanded cavity 2114 and stopped at the stopping step 2111 of the expanded cavity 2114 such that the slanted end (with the second reflective surface 1420) of the cylindrical column 2522 faces towards the connecting portion 22. The distal end 262 of the lead screw 263 interacts with the first biasing surface 2526, whereas the second biasing surface 2527 is pushed from an opposite direction by the spring 217, which is disposed within the expanded cavity 2114 between the second biasing surface 2527 and a stopping surface 2117 formed on a side of the expanded cavity 2114. Thus, when the y-direction adjustment knob 26 is turned, the distal end 262 of the lead screw 263 will constantly push at the first biasing surface 2526 against the elastic force exerted by the spring 217 on the second biasing surface 2527, thus allowing the cylindrical column 2522 to turn about its central axis 2520, which is collinear with the optical axis 1003 of the second lens 132. As a result, the object point on the ferrule surface 320 corresponding to the image point on the image plane 120 will be shifted by a distance in the y-direction. This will be explained later.

The function of the x-direction scanning by the translation of the lens-reflector combo 251 will be explained here. FIG. 7 illustrates the light paths forming an image on the image plane 120 of the optical scanning adapter 20 according to the present invention. For simplicity but not intended to be limiting, the second reflective surface 1420 is shown to be parallel to the first reflective surface 1410. Namely, the second reflective surface 1420 is tilted at 45° from the transverse direction 1002. The lens-reflector combo 251 is shown for two positions 201, 201', with the optical axis 1001 of the first lens 131 respectively aligned with two object points 3211 and 3212 on the ferrule surface 320. The first lens and the first reflective surface for the second position 201' corresponding to the point 3212 are denoted as 131' and 1410', respectively. The points 3211 and 3212 have the same y-coordinate but different x-coordinates on the ferrule surface 320. At the first position corresponding to the object point 3211, the ray from the point 3211 and along the optical axis 1001 of the first lens 131 will pass through the center of the first lens 131, be reflected by the first reflective surface 1410 along the transverse direction 1002, then be reflected by the second reflective surface 1420 along the optical axis 1003 of the second lens 132, and finally pass through the second lens 132 to reach the image plane 120. Besides, since the ferrule surface 320 is placed on the front focal plane 110 of the first lens 131, and the point 3211 is on the optical axis 1001 of the first lens 131, the rays emitted from the point 3211 will pass through the first lens 131 to become collimated rays parallel to the optical axis 1001 of the first lens 131. The collimated rays will then be reflected by the first reflective surface 1410 into rays parallel to the transverse direction 1002. The reflected rays parallel to the transverse direction 1002 will then be reflected by the second reflective surface 1420 into rays parallel to the optical axis 1003 of the second lens 132 and will finally be focused on the image plane 120 to form an image point for the point 3211. Note that the image plane 120 is on the rear focal plane of the second lens system 132.

As mentioned above, the imaging axis of the imaging assembly of the optical scanning adapter 20 is composed of three sections, which are collinear with the optical axis 1001 of the first lens 131 (from the ferrule surface 320 to the point 1411/1411' on the first reflective surface 1410/1410'), the transverse direction 1002 (from the point 1411/1411' to the point 1421 on the second reflective surface 1420) and the optical axis 1003 of the second lens 132 (from the point 1421 to the image point 1201 on the image plane 120), respectively.

When the lens-reflector combo 251 is translationally shifted parallel to the transverse direction 1002, to the second position 201', because the second reflective surface 1420 and the second lens 132 are stationary, the object point on the ferrule surface 320 corresponding to the same image point 1201 on the image plane 120 is shifted to the point 3212. In other words, if the point 3211, 3212 are at the center of the subarea 3201, 3202 of the ferrule surface 320 (shown in FIG. 1B), then the field of view of the inspection probe 40 connected to the optical scanning adapter 20 is shifted from 3201 to 3202. Essentially, only the distance between the first reflective surface 1410 and the second reflective surface 1420 is changed. Therefore, since the object distance $f_1$ and the image distance $f_2$ are unchanged, there is no need to readjust the focus of the connector inspection probe 40. Moreover, the optical magnification, which is $f_2/f_1$, remains the same during the x-direction scanning.

Similarly, when the second reflective surface 1420 is not parallel to the first reflective surface 1410, the analysis above for the x-direction scanning nonetheless remains largely the same and is omitted here.

Figure 8:
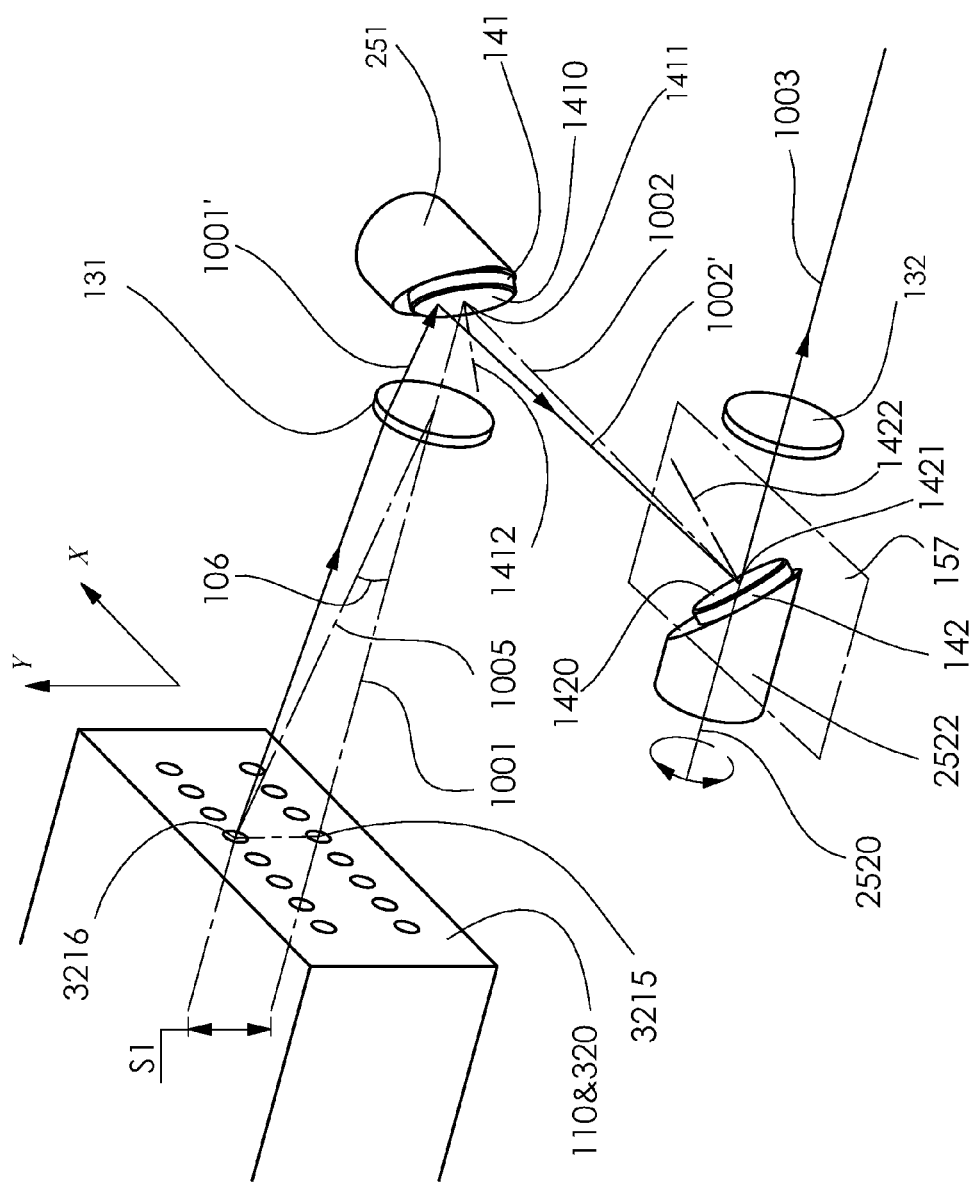
FIG. 8 illustrates how the optical scanning adapter according to the present invention shifts the imaging axis of the connector inspection probe/microscope in a direction orthogonal to the transverse direction over the ferrule surface of the multiple-fiber connector by turning a reflective surface about the imaging axis of the connector inspection probe/microscope.

The function of the y-direction driving mechanism will be explained below. FIG. 8 illustrates the effect of the turning of the second reflective surface 1420 about the central axis 2520 of the cylindrical column 2522, which is collinear with the optical axis 1003 of the second lens 132. As mentioned above, in the optical scanning adapter 20, the second reflective surface 1420 is tilted at an angle relative to the optical axis 1003 of the second lens 132 such that the incident ray along the transverse direction 1002 will be reflected in the direction along the optical axis 1003 of the second lens 132. In that orientation, the normal vector of the first reflective surface 1410 at the point 1411 is 1412, the normal vector of the second reflective surface 1420 at the point 1421 is 1422, and the plane of incidence defined by the normal vector 1422 and the optical axis 1003 of the second lens 132 is the plane 157. When the second reflective surface 1420 is turned an angle β about the optical axis 1003 of the second lens 132, while the direction of the reflected ray along the optical axis 1003 of the second lens 132 remains the same, the plane of incidence defined by the reflected ray along the optical axis 1003 and the associated normal vector of the second reflective surface 1420 at the new angular position of the second reflective surface 1420 will also be turned by the angle β. (For clarity and simplicity, the plane of incidence and the associated normal vector thereof at the new angular position are not shown in FIG. 8.) According to the law of reflection, the incident ray corresponding to the reflected ray along the optical axis 1003 will also be turned by an angle β from the transverse direction 1002 to the direction 1002', and the corresponding incident ray to the first reflective surface 1410 is also turned by an angle β relative to the optical axis 1001 to the direction 1001'. Moreover, the incident ray along the direction 1001' can be traced back to the point 3216 on the ferrule surface 320 of the connector 30, and the line 1005 extending from the point 3216 to the center of the first lens 131 is parallel to the direction 1001'. Therefore, the angle 106 between the line 1005 and the optical axis 1001 of the first lens 131 is equal to β.

Therefore, by turning the second reflective surface 1420 an angle β about the central axis 2520, the object point on the ferrule surface 320 corresponding to the same image point on the image plan 120 is shifted from the point 3215 to the point 3216 in a direction parallel to the y-axis. Because the objective plane is on the front plane of the first lens 131, the distance shifted from the original object point 3215 to the object point 3216 can be calculated by $$S_1 = f_1 \times \tan(\beta),$$

It can be seen that the shifted distance $S_1$ is a function of the angle β and the front focal length $f_1$ of the first lens 131, and is not affected by the distance between the first lens 131 and the first reflective surface 1410 or the distance between the first reflective surface 1410 and the second reflective surface 1420.

Figure 9:
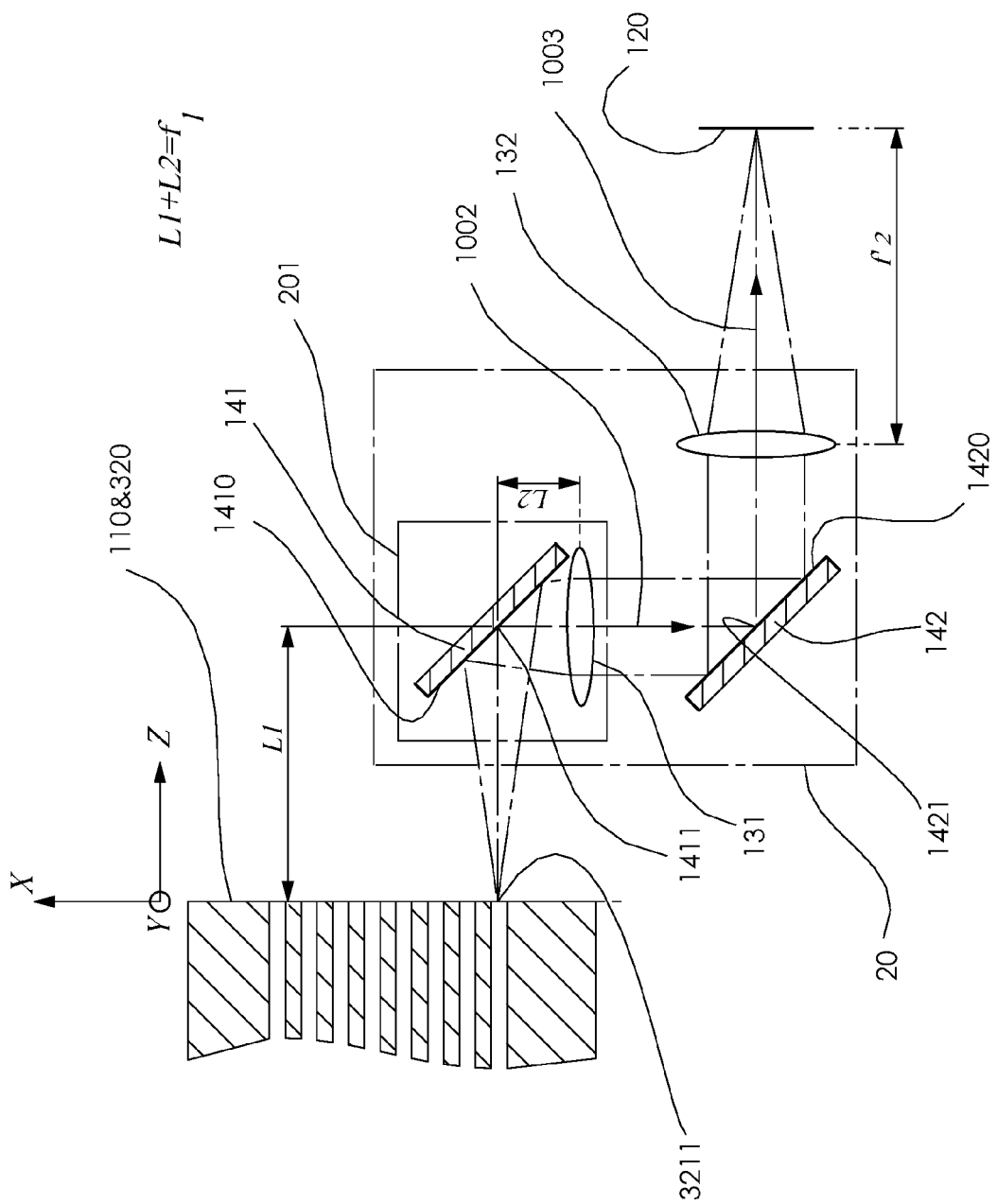
FIG. 9 illustrates an embodiment of the two-dimensional optical scanning adapter according to the present invention with an alternative structure for shifting the imaging axis in the transverse direction.

FIG. 9 illustrates an alternative structure of the lens-reflector combo 251'. In this embodiment, the first lens 131 is placed between the first reflective surface 1410 and the second reflective surface 1420. Similar to the lens-reflector 251, when the lens-reflector 251' is shifted parallel to the transverse direction 1002, the object point on the ferrule surface 320 corresponding to the image point on the image plane 120 is shifted in a direction parallel to the x-axis, e.g. from the point 3211 to the point 3212 as illustrated in FIG. 7. The ray along the transverse direction 1002 passes through the center of the first lens 131, and the front focal length $f_1$ of the first lens 131 satisfies the equation:

$$f_1 = L_1 + L_2$$

wherein $L_1$ is the distance between the ferrule surface 320 and the point 1411, and $L_2$ is the distance between the point 1411 and the center of the first lens 131. The optical analysis of this alternative embodiment is well within the skill of one in the relevant art and is omitted here.

Figure 10:
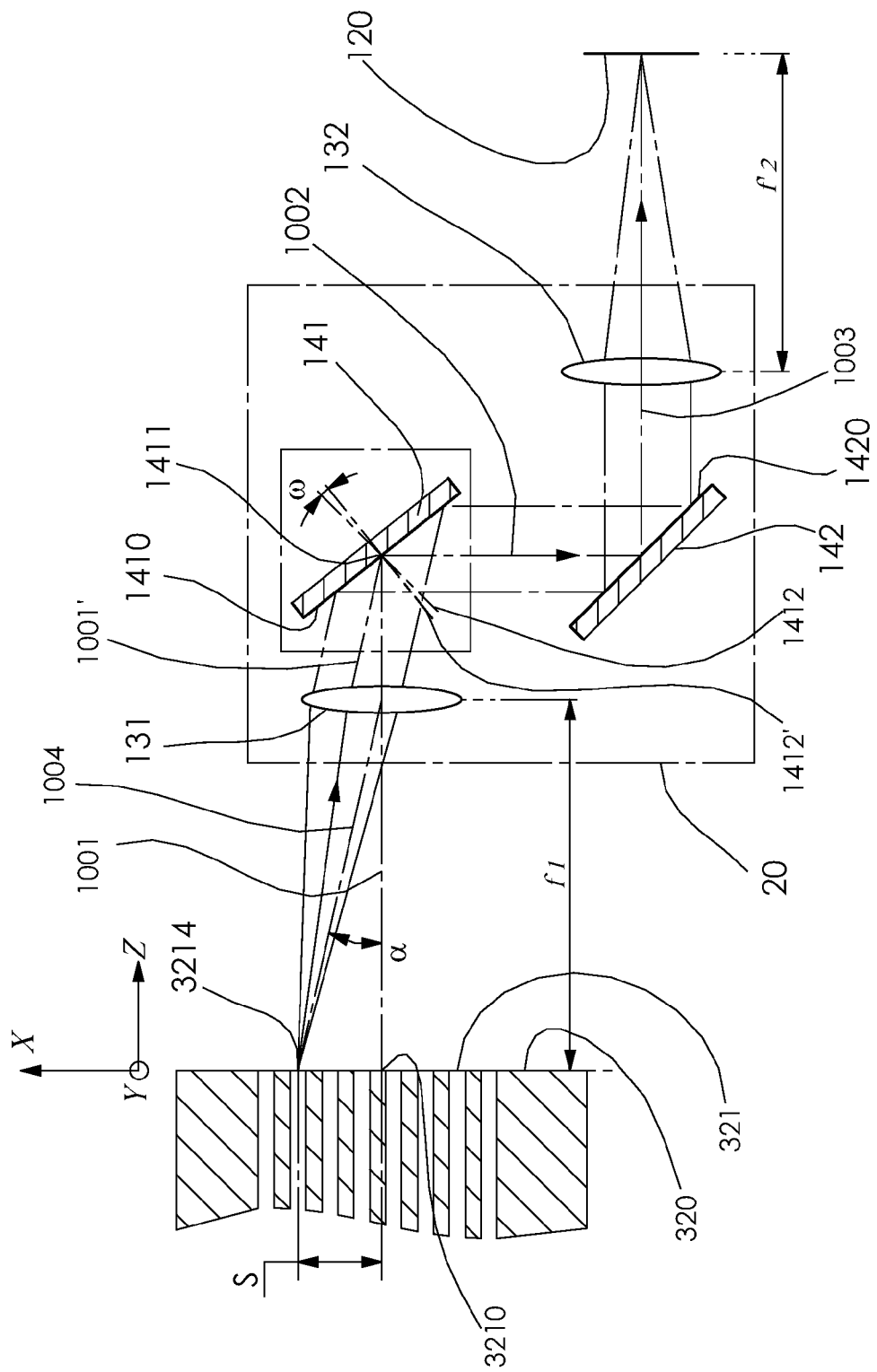
FIG. 10 illustrates an embodiment of the two-dimensional optical scanning adapter according to the present invention with yet another alternative structure for shifting the imaging axis in the transverse direction.

Instead of translational movement of the first lens 131 and the first reflective surface 1410, x-direction scanning can also be achieved by changing the tilting angle of the first reflective surface 1410 or the second reflective surface 1420. FIG. 10 illustrates the x-direction scanning by changing the tilting angle of the first reflective surface 1410. In this embodiment, the first reflective surface 1410 is disposed in a way such that it may be turned about an axis that is parallel to the y axis and intersecting the optical axis 1001 of the first lens 131 on the first reflective surface 1410. The first lens 131, the second reflective surface 1420, and the second lens 132 are not turned along with the first reflective surface 1410. As shown in FIG. 10, when the first reflective surface 1410 is turned by an angle of ω, the normal vector 1412 of the first reflective surface 1410 is also turned by an angle of ω to 1412', and the incident ray corresponding to the reflected ray along the transverse direction 1002 will be the ray emitted from the point 3214 on the ferrule surface 320 and along the direction 1001'. It can be deduced that the angle α between the direction 1001' and the optical axis 1001 of the first lens 131 satisfies $$\alpha = 2\omega$$

According to the optical imaging principle, the ray along the direction 1004 originating from the point 3214 and passing through the center of the first lens 131 is parallel to the incident ray along the direction 1001'. Therefore, the object point forming the image is shifted from the original point 3210 to the point 3214. The distance S between the point 3210 and the point 3214 satisfies the equation:

$$S = f_1 \times \tan(\alpha) = f_1 \times \tan(2\omega).$$

It's worth noting that the distance S is a function of $f_1$ and α only.

Instead of a connector inspection probe 40 or a microscope, other optical devices or systems can be used with the optical scanning adapter 20 of the present invention. For example, a camera sensor can be placed on the image plane 120 to receive the images of the endfaces 321 and transmit the images via video streaming for examination and further analysis.

In one embodiment, as shown in FIG. 3, the housing 21 of the optical scanning adapter 20 comprises a removable side cover 212 for covering the lens-reflector combo 251 and for accommodating the lead screw 271 of the x-direction driving mechanism through the threaded hole 2127.

In FIG. 4, the fitting tip 29 takes the form of a connector holder 28 in the optical scanning adapter 20. The connector holder 28 can directly receive the ferrule surface 320 of an MTP/MPO connector 30 without using an MTP/MPO adapter 50 shown in FIG. 2. The front portion 350 of the connector 30 can be inserted into a matching opening 285 on the front side of the connector holder 28 to place the ferrule surface 320 and the endfaces 321 embedded therein on a plane 281 (corresponding to the mating interface 291 of the fitting tip 29). When the connector holder 28 is included in the adaptive scanning adapter 20, the plane 281 will coincide with the front focal plane or object plane 110 of the first lens 131. In a sense, the connector holder 28 is a special type of fitting tip 29 described earlier.

The invention is not to be limited to the exact structure and features shown in the accompanying drawings or described in the specification as various changes in the details of construction may be made without departing from the spirit of the invention.

What is claimed is:

1. An optical scanning adapter for an inspection probe for inspecting multiple-fiber optic connector having fiber endfaces embedded in and flush with a ferrule surface, the optical scanning adapter comprising:
   a housing;
   a mating interface disposed at a front side of the housing for interfacing with the ferrule surface of an external multiple-fiber optic connector, wherein the mating interface defines an endface interfacing plane on which the ferrule surface is placed when interfaced with the mating interface;

an imaging assembly enclosed in the housing, the imaging assembly comprising:
   a first lens having an optical axis perpendicular to the endface interfacing plane and a front focal plane coplanar with the endface interfacing plane;
   a planar first reflective surface disposed rearward to the first lens, wherein the optical axis of the first lens intersects the first reflective surface at a first intersection point and forms an angle of 45° from the first reflective surface;
   a second lens having an optical axis coplanar with the optical axis of the first lens; and
   a planar second reflective surface disposed forward to the second lens, wherein the second reflective surface faces the first reflective surface, and the optical axis of the second lens intersects the second reflective surface at a second intersection point,
   wherein a transverse direction extending through the first intersection point and the second intersection point is perpendicular to the optical axis of the first lens and is coplanar with a normal vector of the first reflective surface at the first intersection point, and
   the second reflective surface is tilted at a predetermined angle from the optical axis of the second lens such that a normal vector of the second reflective surface at the second intersection point is coplanar with the transverse direction and the optical axis of the second lens and bisects the angle formed by the transverse direction and the optical axis of the second lens into two congruent angles;
a connecting portion disposed at a rear side of the housing for interfacing with an inspection probe, such that a rear focal plane of the second lens coincides with an object plane of the inspection probe;
an x-direction driving mechanism for translationally moving the first lens and the first reflective surface together, relative to the housing, in a direction parallel to the transverse direction; and
a y-direction driving mechanism for causing the second reflective surface to turn about an axis collinear with the optical axis of the second lens,
wherein a ray emitted from a point on the ferrule surface and passing through the first lens is reflected by the first reflective surface towards the second reflective surface, then is reflected by the second reflective surface towards and through the second lens, forming a corresponding image point at the rear focal plane of the second lens;
wherein when the x-direction driving mechanism translationally moves the first lens and the first reflective surface together parallel to the transverse direction, the image point formed at the rear focal plane of the second lens continuously corresponds to points on the ferrule surface along an x-direction track parallel to the transverse direction, thus allowing fiber endfaces along the x-direction track on the ferrule surface to be inspected or imaged; and
when the y-direction driving mechanism causes the second reflective surface to turn about the optical axis of the second lens, the image point formed at the rear focal plane of the second lens continuously corresponds to points on the ferrule surface along a y-direction track orthogonal to the transverse direction, thus allowing fiber endfaces along the y-direction track on the ferrule surface to be inspected or imaged.

2. The optical scanning adapter of claim 1, wherein the transverse direction is parallel to rows of fiber endfaces on the ferrule surface interfaced with the mating interface.

3. The optical scanning adapter of claim 2, wherein the optical axis of the second lens is parallel to the optical axis of the first lens.

4. The optical scanning adapter of claim 2, wherein the optical axis of the second lens is not parallel to the optical axis of the first lens.

5. The optical scanning adapter of claim 2, wherein the first lens and the first reflective surface are fixed in a cylindrical lens-reflector combo having an outer contour corresponding to an inner contour of a sliding guide hole extending parallel to the transverse direction inside the housing, such that the lens-reflector combo is translationally movable inside the sliding guide hole.

6. The optical scanning adapter of claim 5, wherein the lens-reflector combo has a circular cross section.

7. The optical scanning device of claim 5, wherein the x-direction driving mechanism comprises an adjustment knob with a lead screw passing through a matching threaded hole of the housing, an angled lever hinged to the housing, and a helical spring set between the lens-reflector combo and a stopping surface, a distal end of the lead screw being moved forward or backward by turning the adjustment knob to interact with one end of the angled lever, causing another end of the angled lever to turn and push at a pushing step on the lens-reflector combo against the helical spring.

8. The optical scanning adapter of claim 5, wherein
   the second reflective surface is disposed on a slanted end of a circular cylindrical column having a central axis collinear with the optical axis of the second lens, and
   at least a portion of the cylindrical column is placed inside a circular cylindrical turning guide hole having a diameter essentially the same as that of the cylindrical column, so that the cylindrical column may turn smoothly about the central axis in the cylindrical turning guide hole.

9. The optical scanning adapter of claim 8, wherein the y-direction driving mechanism comprises an expanded rim connected to a flat end of the cylindrical column, an adjustment knob with a lead screw passing through a matching threaded hole of the housing into the housing, and a spring fixed in position at a first end thereof, the expanded rim having a first off-center biasing surface being pushed and a second off-center biasing surface being pushed by a distal end of the lead screw and a second end of the spring, respectively, whereby
   when the adjustment knob is turned to advance or retract the lead screw, the second reflective surface will be turned about the optical axis of the second lens between the distal end of the lead screw and the second end of the spring.

10. The optical scanning adapter of claim 1, wherein the optical axis of the second lens is parallel to the optical axis of the first lens.

11. The optical scanning adapter of claim 1, wherein the optical axis of the second lens is not parallel to the optical axis of the first lens.

12. The optical scanning adapter of claim 1, wherein the mating interface is disposed in a fitting tip connected to the front side of the housing.

13. The optical scanning adapter of claim 1, wherein the mating interface is disposed in a connector holder connected to the front side of the housing.

* * * * *